United States Patent
Hofmann

(10) Patent No.: US 11,215,707 B2
(45) Date of Patent: Jan. 4, 2022

(54) ENHANCED OBJECT DETECTION AND MOTION ESTIMATION FOR A VEHICLE ENVIRONMENT DETECTION SYSTEM

(71) Applicant: VEONEER SWEDEN AB, Vargarda (SE)

(72) Inventor: Martin Hofmann, Puchheim (DE)

(73) Assignee: VEONEER SWEDEN AB, Vargarda (SE)

( * ) Notice: Subject to any disclaimer, the term of this patent is extended or adjusted under 35 U.S.C. 154(b) by 240 days.

(21) Appl. No.: 16/475,505

(22) PCT Filed: Jan. 12, 2018

(86) PCT No.: PCT/EP2018/050717
§ 371 (c)(1),
(2) Date: Jul. 2, 2019

(87) PCT Pub. No.: WO2018/130634
PCT Pub. Date: Jul. 19, 2018

(65) Prior Publication Data
US 2019/0346561 A1 Nov. 14, 2019

(30) Foreign Application Priority Data

Jan. 13, 2017 (EP) .................... 17151310

(51) Int. Cl.
*G01S 13/931* (2020.01)
*G01S 13/58* (2006.01)
(Continued)

(52) U.S. Cl.
CPC ............ *G01S 13/931* (2013.01); *G01S 13/58* (2013.01); *G01S 13/72* (2013.01); *G06K 9/00805* (2013.01)

(58) Field of Classification Search
CPC ......... G01S 13/931; G01S 13/58; G01S 13/72
(Continued)

(56) References Cited

U.S. PATENT DOCUMENTS 5,929,803 A * 7/1999 Uehara .................. G01S 7/415
342/70
6,140,954 A 10/2000 Sugawara et al.
(Continued)

FOREIGN PATENT DOCUMENTS

DE 10 2008 025 773 A1 1/2009
EP 0 932 052 A2 7/1997
(Continued)

OTHER PUBLICATIONS

International Search Report and Written Opinion of PCT/EP2018/050717 dated Apr. 18, 2018.

*Primary Examiner* — Bo Fan
(74) *Attorney, Agent, or Firm* — Dickinson Wright PLLC

(57) ABSTRACT

A vehicle environment detection system (2) that includes at least one radar sensor arrangement (3) and at least one processing unit (4), where the radar sensor arrangement (3) is arranged to detect at least two radar detections (9, 10, 11) during at least two radar cycles. For each radar cycle, the processing unit (4) generates a detection list ($\{D_i^t\}^{t=t_0, \ldots, t_0-N}$) including range ($r_i$), azimuth angle ($\varphi_i$) and Doppler velocity ($v_i$) for each of the radar detections (9, 10, 11). The processing unit (4) is further arranged to aggregate and store detection lists ($\{D_i^t\}^{t=t_0, \ldots, t_0-N}$) from the radar cycles in a detection memory (12), and then to group the radar detections (9, 10, 11) in the detection lists ($\{D_i^t\}^{t=t_0, \ldots, t_0-N}$) into consistently moving motion subsets (40, 41, 42) in a segmentation procedure. Each motion subset (40, 41, 42) corresponds to a certain target object (6, 7, 8).

8 Claims, 6 Drawing Sheets

(51) Int. Cl.
*G01S 13/72* (2006.01)
*G06K 9/00* (2006.01)

(58) Field of Classification Search
USPC .............................................. 342/70, 90, 107
See application file for complete search history.

(56) References Cited

U.S. PATENT DOCUMENTS

| | | |
|---|---|---|
| 7,224,309 B2 | 5/2007 | Shimomura |
| 8,674,873 B2 | 3/2014 | Shibata et al. |
| 8,724,296 B2 | 5/2014 | Ishikawa et al. |
| 9,255,988 B2 | 2/2016 | Zeng et al. |
| 9,411,043 B2 | 8/2016 | Ikeya et al. |
| 2005/0122251 A1* | 6/2005 | Shimomura .......... G01S 13/931 342/70 |
| 2010/0271257 A1* | 10/2010 | Hirogari ............... G01S 13/726 342/107 |
| 2011/0074622 A1* | 3/2011 | Shibata ................. G01S 13/726 342/90 |

FOREIGN PATENT DOCUMENTS

| | | |
|---|---|---|
| EP | 1 522 873 A1 | 4/2005 |
| EP | 2 781 930 A1 | 9/2014 |

\* cited by examiner

ENHANCED OBJECT DETECTION AND MOTION ESTIMATION FOR A VEHICLE ENVIRONMENT DETECTION SYSTEM

CROSS-REFERENCE TO RELATED APPLICATIONS

This application is a 35 U.S.C. § 371 national phase of PCT International Application No. PCT/EP2018/050717, filed Jan. 12, 2018, which claims the benefit of priority under 35 U.S.C. § 119 to European Patent Application No. 17151310.4, filed Jan. 13, 2017, the contents of which are incorporated herein by reference in their entirety.

DESCRIPTION OF THE DISCLOSURE

The present disclosure relates to a vehicle environment detection system that includes at least one radar sensor arrangement and at least one processing unit. The radar sensor arrangement is arranged to detect at least two radar detections during at least two radar cycles. For each radar cycle, the processing unit is arranged to generate a detection list including range, azimuth angle and Doppler velocity for each one of the radar detections.

Today, vehicle environment detection systems, such as for example camera systems, Doppler radar systems and LIDAR systems, can be mounted on a vehicle in order to detect objects in order to implement functions such as speed control and collision prevention, as well as other such as auto alignment, online bumper fascia calibration, ego motion estimation and scene understanding. For this purpose, it is desired to obtain a common motion state for an extended object.

The document DE 102008025773 relates to estimating a location and movement state of an observed object using stereo image processing. 3D points are tracked using a Kalman filter for the image sequences. Keeping track of 3D points leads to so-called 6D vectors in which a 3D position is combined with a 3D velocity vector.

Furthermore, it is also desired to track not only one, but a plurality of extended objects, moving as well as stationary, in the present field of view. U.S. Pat. No. 9,255,988 describes how radar data, including Doppler measurement data, are used to form clusters, where each cluster represents a respective object.

There is still a need for an improved device and method for a vehicle environment detection system where motion states for two or more moving and/or stationary extended object is obtained. Desired properties are for example robustness against noise as well as wrong and error prone fitting algorithms.

The above-mentioned desirable features are achieved by a vehicle environment detection system according to embodiments of the present invention that includes at least one radar sensor arrangement and at least one processing unit. The radar sensor arrangement is arranged to detect at least two radar detections during at least two radar cycles. For each radar cycle, the processing unit is arranged to generate a detection list including range, azimuth angle and Doppler velocity for each one of the radar detections. The processing unit is further arranged to aggregate and store detection lists from the radar cycles in a detection memory, and then to group the radar detections in the detection lists into consistently moving motion subsets in a segmentation procedure. Each motion subset corresponds to a certain target object.

This is also achieved by a method for grouping at least two target objects detected outside a vehicle using a radar sensor arrangement that is used for detecting radar detections The method includes the steps of:

Detecting at least two radar detections during at least two radar cycles.

For each radar cycle, generating a detection list including range, azimuth angle and Doppler velocity for each one of the radar detections.

Aggregating and storing detection lists from the radar cycles in a detection memory.

Grouping the radar detections in the detection lists into consistently moving motion subsets in a segmentation procedure, where each motion subset corresponds to a certain target object.

According to an example embodiment, for each radar cycle, the processing unit is arranged to:

Generate an output list of motion subsets, where the output list includes a group motion vector for each motion subset, and where each group motion vector represents a group motion of a respective motion subset.

Generate a labelling of each input detection, where, for each radar detection, the labelling includes an object identifier which describes to which motion subset a given radar detection belongs, and additional flags for each radar detection.

According to another example embodiment, in order to perform the segmentation procedure, for each one of all available motion subsets the processing unit is arranged to:

Predict a present motion subset for the next radar cycle, independently of other motion subsets.

Associate new radar detections with the present motion subset.

Generate an updated group motion vector.

The processing unit is further arranged to generate an updated list of motion subsets.

Other examples are disclosed in the dependent claims.

A number of advantages are obtained by the present disclosure. A vehicle environment detection system and a corresponding method is provided, where motion states for two or more moving and/or stationary extended object is obtained where, for example, robustness against noise as well as wrong and error prone fitting algorithms is obtained.

Previously, extended object tracking employs trying to fit a model directly to input data. Usually, these models are parametrized; for example a box model, spline model, ellipsoid model, or others.

In contrast to these approaches, the present disclosure relates to a non-parametric object model. This means that there is no need to fit a parametric model of any kind. Instead the model is defined by a non-parametric labelling of the input data. This gives the flexibility to track arbitrary extended objects of any possible shape and size.

BRIEF DESCRIPTION OF THE DRAWINGS

The present disclosure will now be described more in detail with reference to the appended drawings, where.

DETAILED DESCRIPTION

Figure 1:
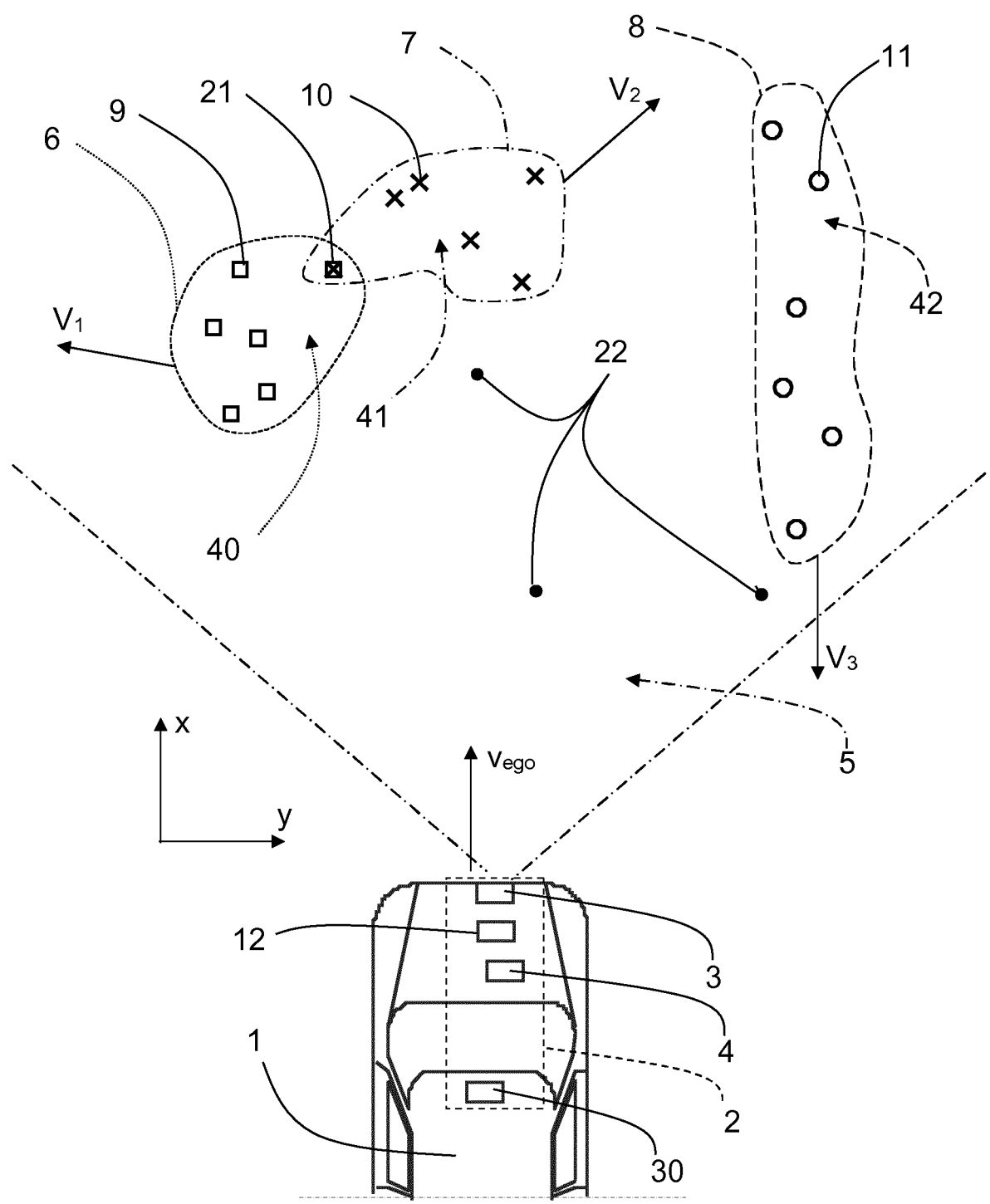
FIG. 1 shows a schematic top view of a vehicle with a vehicle environment detection system.

With reference to FIG. 1, showing a first example, an ego vehicle 1 includes a vehicle environment detection system 2 that in turn includes a radar sensor arrangement 3 and a processing unit 4, where the radar sensor arrangement 3 has a certain field of view 5 that is directed in front of the vehicle 1. There are three target objects 6, 7, 8 present in the field of view 5, where these targets objects 6, 7, 8 are detected by a plurality of radar detections 9, 10, 11 for each target object.

For a first target object 6, there is a first plurality of radar detections 9 that are shown as squares; for a second target object 7, there is a second plurality of radar detections 10 that are shown as crosses, and for a third target object 8, there is a third plurality of radar detections 11 that are shown as circles. For reasons of clarity, only one radar detection is denoted with a reference number in the relevant drawings for each plurality of radar detections.

The first target object 6 is moving with a first velocity in a first direction according to a first group motion vector $V_1$, the second target object 7 is moving with a second velocity in a second direction according to a second group motion vector $V_2$, and the third target object 8 is moving with a third velocity in a third direction according to a third group motion vector $V_3$.

All the radar detections 9, 10, 11 are divided and grouped into distinct and consistently moving motion subsets 40, 41, 42 such that the processing unit 4 is enabled to identify different target objects 6, 7, 8 and to separate these from each other.

Figure 2:
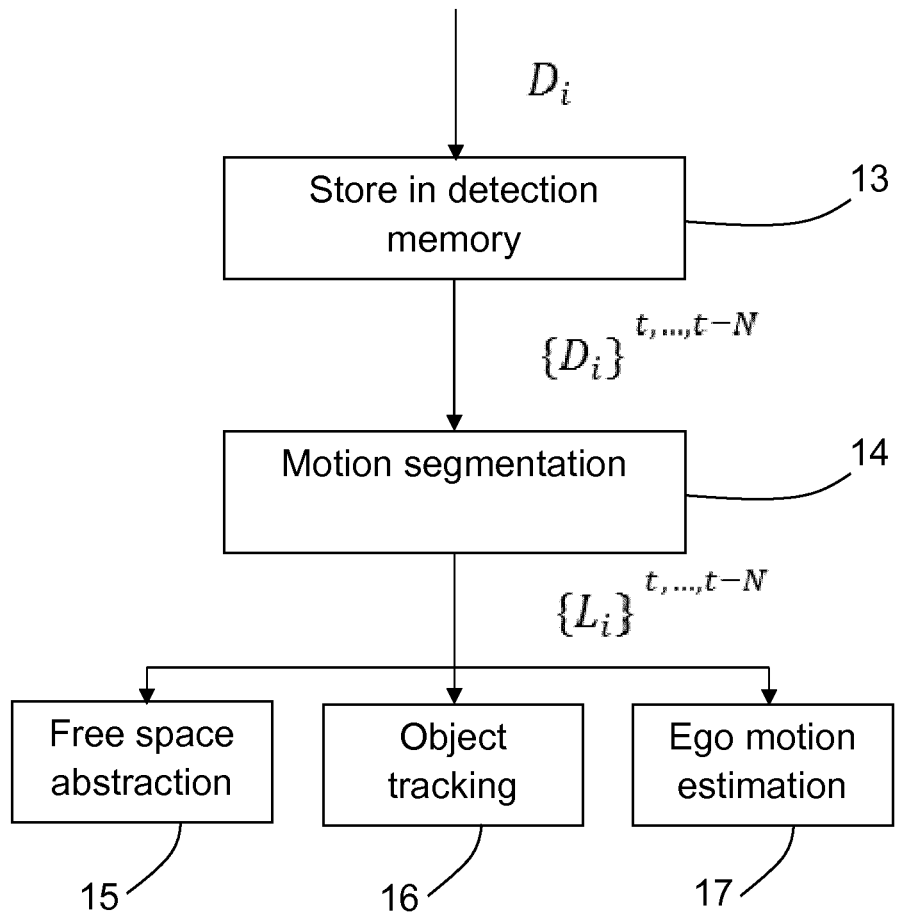
FIG. 2 shows an overview flowchart for the present disclosure.

More in detail, with reference also to FIG. 2, at each radar cycle a detection list including radar detections is generated by radar signal processing at the processing unit 4. Each radar detection in the list is at least defined by range $r_i$, azimuth angle $\varphi_i$ and Doppler velocity $v_i$, which means that a general radar detection $D_i = (r_i, \varphi_i, v_i)$.

In this context, a radar cycle is one observation phase during which the vehicle environment detection system 2 is arranged to acquire data, process the data on several signal processing levels and to send out available results. This can be a fixed time interval (e.g. 40 to 60 milliseconds), or it can be a dynamic time interval depending on environment conditions and processing load.

At a first processing step 13, according to the present disclosure, the processing unit 4 is arranged to aggregate and store a detection list $\{D_i^t\}^{t=t_0, \ldots, t_0-N}$. N is the number of radar cycles, $t_0$ is the current cycle, $t_0-1$ is the previous cycle, $t_0-2$ is two cycles in the past, and $t_0-N$ is N cycles in the past.

This detection list $\{D_i^t\}^{t=t_0, \ldots, t_0-N}$ is aggregated and stored from each radar cycle in a detection memory 12 connected to the processing unit 4. In this way, not only detections from a current radar cycle are considered, but also detections observed in previous radar cycles. To this end, the detection lists obtained in each radar cycle are stored in the detection memory 12 for up to N radar cycles.

At a second processing step 14, the processing unit 4 is arranged to perform motion segmentation where motion segmentation is performed for all incoming radar detections from all available stored cycles. Motion segmentation is achieved by grouping the stored radar detections 9, 10, 11 in the detection lists $\{D_i^t\}^{t=t_0, \ldots, t_0-N}$ into consistently moving motion subsets 40, 41, 42 corresponding to the target objects 6, 7, 8.

This output is represented by:
a list M of motion subsets, and
a labelling $L_i$ of each input detection.

Generally, the list M of motion subsets is here written as $M = \{V_1, V_2, \ldots, V_k, \ldots, V_n\}$ and contains for each motion subset a group motion vector $V_k$ which represents the group motion of a respective motion subset.

The labelling $L_i = (I_i, f_i)$ for each radar detection includes:
an object identifier $I_i$ which describes to which motion subset a given radar detection belongs, as well as
additional flags $f_i$ for each radar detection.

The result can be used for one or more of a plurality of following processing steps such as for example free space abstraction 15, object tracking 16 and ego motion estimation 17.

Other examples relates to using determined stationary detections for better free space detection and detection of drivable surfaces. Moving and stationary detections that have been identified to belong to certain target objects 6, 7, 8 can also be used for auto-alignment and online bumper fascia calibration. Other applications include ego motion estimation from radar, as well as for radar-based scene understanding.

The motion segmentation constitutes a rich representation of the incoming data, and is achieved by both spatial proximity features as well as motion similarity. In this example, as shown in FIG. 1, the ego vehicle 1 is moving straight forward in an x-direction with an ego velocity $v_{ego}$. Stationary objects will induce exactly this group velocity in relative coordinates, having a third motion vector $v_3$ that equals the ego velocity $v_{ego}$. In this example, this is shown for the third target object 8, which is the group of ground stationary objects, for example a guard rail. The other two target objects 6, 7 represent two other distinct objects which are spatially close to each other, but have a different respective first motion vector $V_1$ and second motion vector $V_2$.

Figure 3:
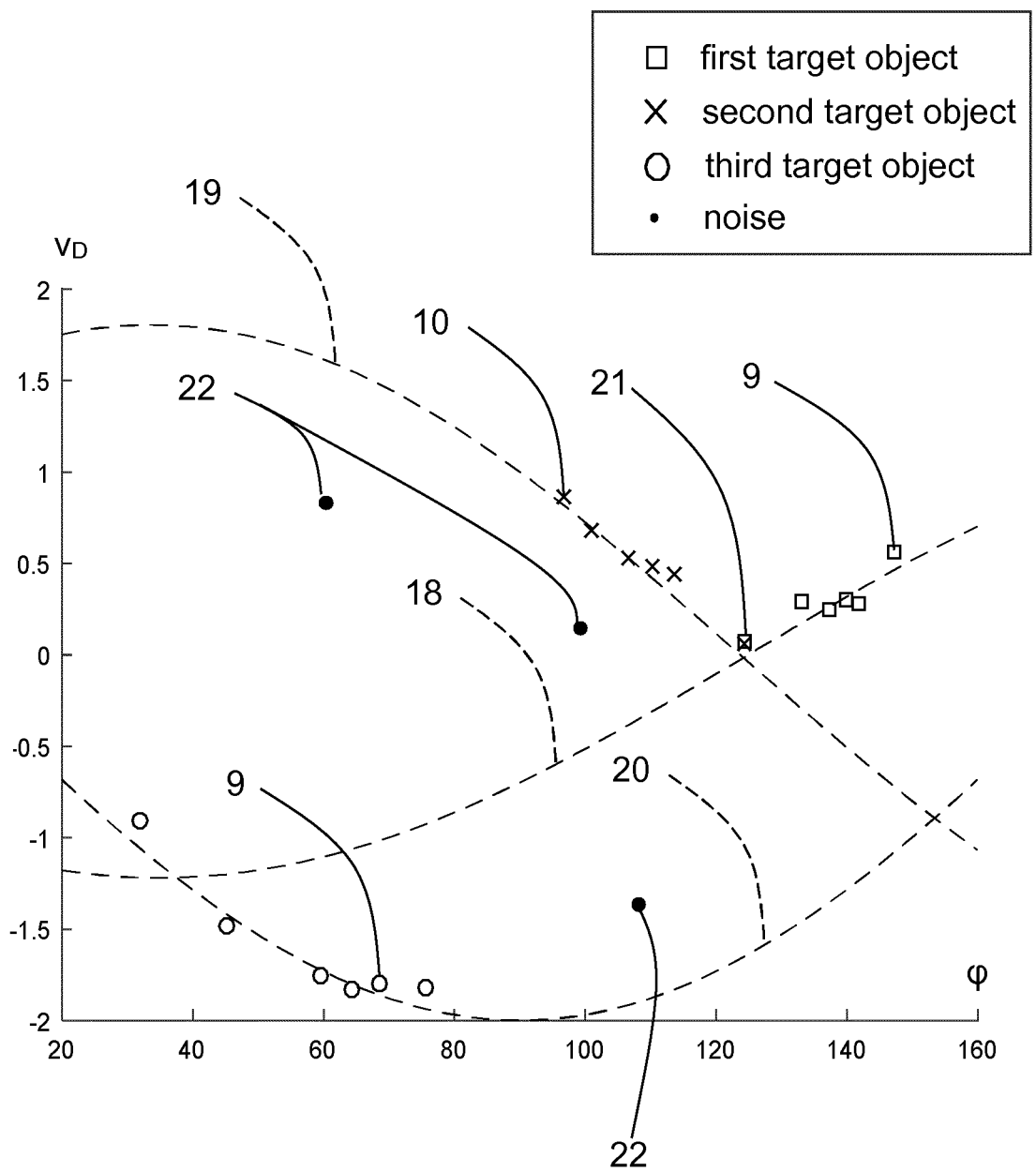
FIG. 3 shows a graphic representation of radar detections in an azimuth angle vs. Doppler velocity domain.

When performing motion segmentation, the motion vectors $V_1$, $V_2$, $V_3$ are not directly observable since a Doppler radar can measure range, azimuth angle and radial Doppler velocity, but not the tangential velocity component. Therefore, with reference also to FIG. 3, the motion segmentation leverages the fact that multiple reflections from a single rigidly moving object lie on a cosine function in an azimuth angle $\varphi$ vs. Doppler velocity $v_D$ domain. Here, the same radar detections 9, 10, 11 as shown in FIG. 2 are present, represented in the azimuth angle $\varphi$ vs. Doppler velocity $v_D$ domain. It is here shown that the first plurality of radar detections 9 follow a first cosine curve 18, the second plurality of radar detections 10 follow a second cosine curve 19 and the third plurality of radar detections 11 follow a third cosine curve 20. One ambiguous radar detection 21 is present in an intersection between the first cosine curve and the second cosine curve; this ambiguous radar detection 21 is also shown in FIG. 1.

Figure 4:
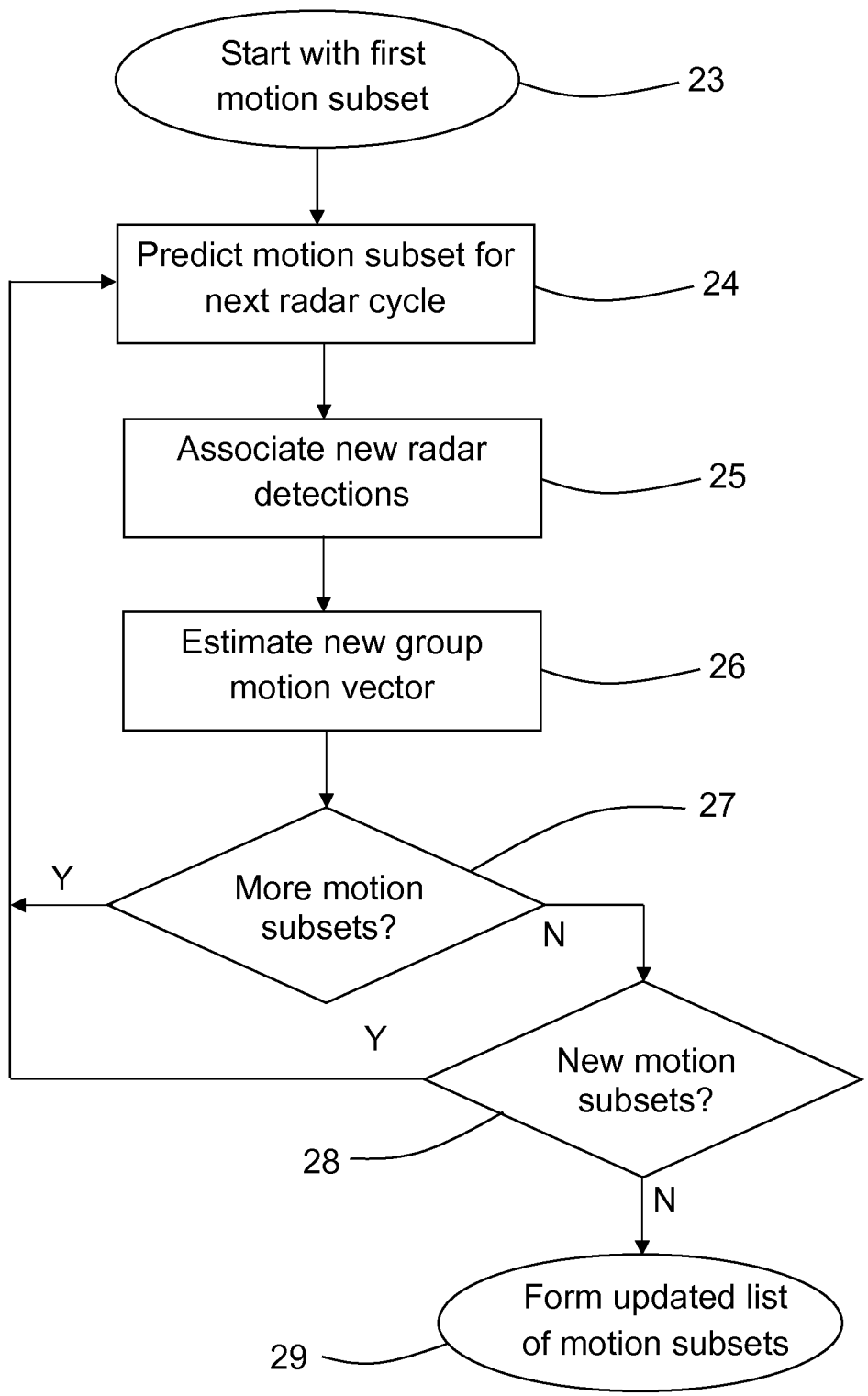
FIG. 4 shows a flowchart for a segmentation process.

The motion segmentation process according to the second processing step 14 above runs in the following segmentation steps as depicted in FIG. 4. Starting from a first motion subset 40 in a first segmentation step 23, for example corresponding to the first target object 6, the first motion subset 40 is in a second segmentation step 24 predicted for the next radar cycle, independently of other motion subsets 41, 42.

In a third segmentation step 25, new incoming radar detections in a next radar cycle are associated with the present motion subset. In a fourth segmentation step 26, an updated group motion vector is estimated. In a fifth segmentation step 27 it is checked if there are more motion subsets, and the second to fourth segmentation steps 24, 25, 26 are repeated for all available motion subsets. In order to propagate the present motion subset 40 to a next radar cycle, this motion subset 40 is first predicted, new radar detections are associated, and finally the group motion vector is updated.

When all available motion subsets 40, 41, 42 have been processed, new motion subsets are searched for by consideration of unassociated detections in a sixth segmentation step 28. Possible new motion subsets are processed according to the second to fourth segmentation steps. When there are no new motion subsets, an updated list $M_u$ of motion subsets is created in a seventh segmentation step 29.

As mentioned above, each target object 6, 7, 8 corresponds to a motion subset 40, 41, 42 that is represented by a corresponding group motion vector $V_1$, $V_2$, $V_3$ and a labelling of the associated detections. No further abstractions such as position, box model, etc. are needed to describe the state of a motion subset. This is advantageous since no model fitting is needed; instead each motion subset 40, 41, 42 is described directly from the input data. This provides robustness against noise and erroneous prone fitting algorithms.

The above segmentation steps will now be described more in detail. Regarding the second segmentation step 24, prediction is performed based on the radar detections 9, 10, 11 which belong to a given motion subset 40, 41, 42. For each motion subset 40, 41, 42, each one of the corresponding detections 9, 10, 11 is moved in the x- and y-direction according to the present group motion vector. According to some aspects, data from multiple previous cycles, which are stored in the detection memory 12, are used. This means that radar detections 9, 10, 11 which are associated with a certain motion subset 40, 41, 42 are predicted from several previous radar cycles.

Regarding the third segmentation step, association is performed by spatial considerations where new radar detections from the next cycle are associated, i.e. considered for an update, if they are close enough to any of the corresponding radar detections belonging to a certain motion subset. This does not rely on model information and depends only on the position of the predicted detections of motion subset. In this way, a non-parametric extended shape model is realized. Furthermore, additional robustness of this non-parametric model is achieved by including detections from several previous radar cycles, stored in the detection memory, in the association process. The shape of a tracked object is then defined by associated detections from several previous radar cycles.

Regarding the fourth segmentation step, the radar detections which are spatially close are considered inlier candidates. For these candidates, a full group motion vector is estimated using the angle and Doppler velocity information. It is assumed that detections belonging to the same object have a shared group motion vector. The projection of this group motion vector onto the radial direction of each individual detection, determined by the measured angle, corresponds to the measured Doppler velocity. This corresponds to:

$$\begin{bmatrix} v_1 \\ v_2 \\ \vdots \\ v_n \end{bmatrix} = \begin{bmatrix} \cos(\varphi_1) & \sin(\varphi_1) \\ \cos(\varphi_2) & \sin(\varphi_2) \\ \vdots & \vdots \\ \cos(\varphi_n) & \sin(\varphi_n) \end{bmatrix} \cdot \begin{bmatrix} v_x \\ v_y \end{bmatrix}. \quad (1)$$

Inverting equation (1) results in an estimate of the group motion vector $$\begin{bmatrix} v_x \\ v_y \end{bmatrix}. \quad (2)$$

Some measured angles (pi and measured Doppler velocities $v_i$ of the radar detections 9, 10, 11 are noisy and outliers, for example due to rotating wheels, can result in deviation from this ideal equation. Radar detections 22 that are due to noise are shown with dots in FIG. 1 and FIG. 2. Therefore, in practice and to increase robustness, robust estimators such as RANSAC (Random sample consensus) can be used to reject outliers from this estimation process. Outliers are then removed and inliers remain. Then each detection is labelled with the additional information $f_i$ indicating whether it is an inlier or outlier with respect to the velocity profile. In later processing stages, this can for example be utilized for wheel detection and object classification.

Physical objects are typically seen by the radar sensor arrangement 3 as multiple detections per radar cycle, especially in a near range. In some situations, there can be a smaller number of detections. This is the case for example at a far range, or for small objects such as pedestrians. To increase the number of detections the detection memory (12) is used to also store detections from previous radar cycles. In this way, even with a low number of detections per cycle, a full group velocity estimate according to equation (1) is possible.

In the presented example, the first target object 6 and the second target object 7, as well as their corresponding motion subsets 40, 41, are spatially close to each other. One of the detections, the ambiguous radar detection 21, is associated to both motion subsets 40, 41 because of its spatial proximity. In addition, this ambiguous radar detection 21 also fulfills the velocity profile according to equation (1) and is therefore close to both the first cosine curve and the second cosine curve as discussed previously. This radar detection 21 is indicated as determined to constitute an ambiguous radar detection for two or more motion subsets 40, 41, which is vital information for the processing unit 4 in further processing stages. For example, an extended object tracking algorithm can be adapted to ignore ambiguous detections when shape estimation is performed.

Figure 5A:
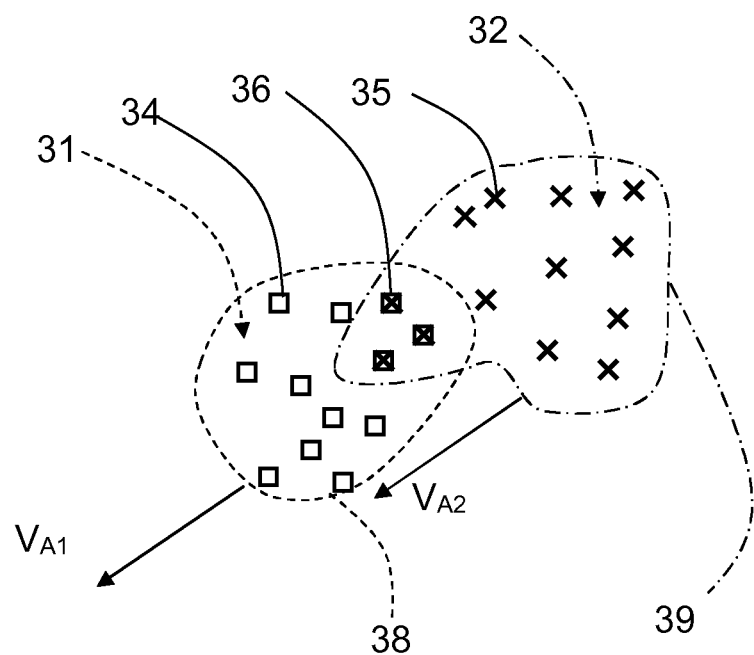
FIG. 5(A) shows a schematic top view of radar detections in motion subsets before merging.

Distinct motion subsets, and then also corresponding target objects 38, 39, can become indistinguishable from each other if the corresponding targets objects get too close to each other and also more or less move in the same direction. For example, as shown in FIG. 5A, two distinct motion subsets 31, 32 can result from a single physical target object 33 that can be relatively large. Both these motion subsets 31, 32 have equal group motion vectors $V_{A1}$, $V_{A2}$, and in the azimuth angle vs. Doppler velocity domain, the two corresponding cosine curves overlap. In this case many, or even all, associated radar detections 34, 35, 36 are determined to be ambiguous.

Figure 5B:
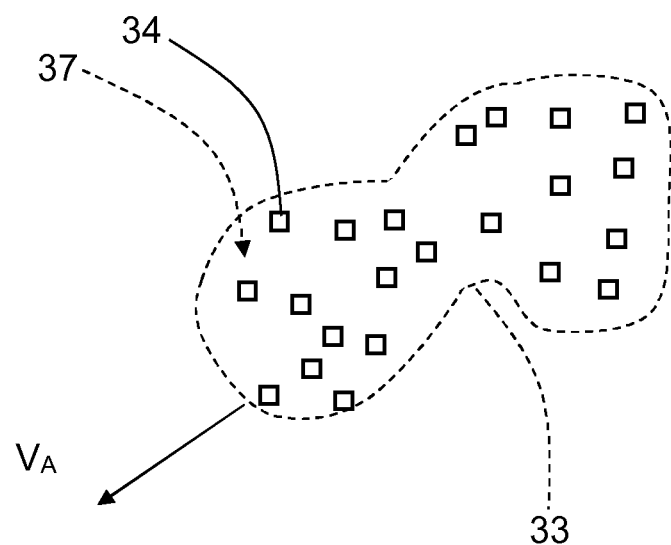
FIG. 5(B) shows a schematic top view of radar detections in motion subsets after merging.

Therefore, according to some aspects and with reference also to FIG. 5B, the processing unit 4 is arranged to perform a merge function for merging two motion subsets 31, 32 into one merged subset 37. To this end, the processing unit 4 is arranged to check for detections that have been determined to be ambiguous and to check if the associated motion subsets have equal, or at least very similar, group motion vectors $V_{A1}$, $V_{A2}$. If that is the case, the processing unit 4 is arranged to merge two motion subsets 31, 32 and the corresponding radar detections 34 into a resulting merged motion subset 37, and consequently the corresponding target objects 38, 39 are merged to one and the same corresponding target object 33 having one group motion vectors VA.

Merging itself is straight-forward; since the group velocity vectors $V_{A1}$, $V_{A2}$ are identical, or at least very similar, the processing unit 4 is arranged to perform averaging or a similar approach that provides a merged group velocity vector. The processing unit 4 is arranged to model the spatial extent of the merged motion subset by labelling the associated detections. All the corresponding labelled detections only need to be assigned the identification of the merged motion subset. The non-parametric shape model is thus beneficial for target object merging of this kind.

According to some aspects, regarding the sixth segmentation step, the processing unit 4 is arranged to determine that radar detections which are not associated with any existing motion subset are unassociated. For unassociated radar detections, a seeker algorithm can search for new motion subsets. According to some aspects, classical seeker algorithms which are arranged to search a consistent stream of single detections can be used. However, directly estimating a full group motion vector using detections from a single radar cycle by applying equation (1) is also conceivable. This allows for very fast object initialization, especially in the near range where objects typically reflect from multiple angles and thus result in multiple detections.

Figure 6:
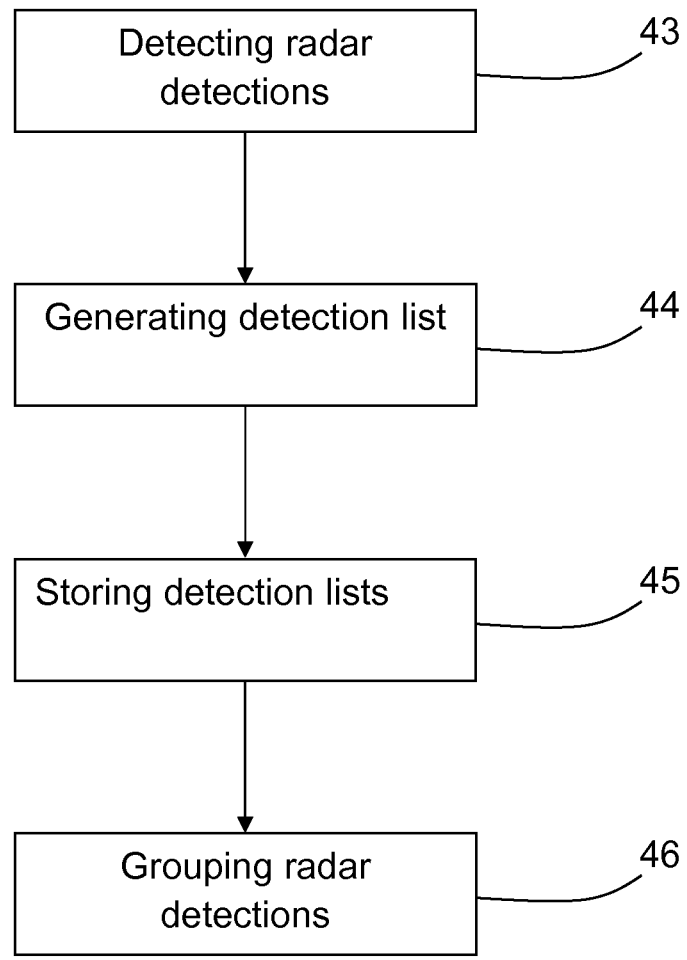
FIG. 6 shows a flowchart for a method according to the present disclosure.

With reference to FIG. 6, the present disclosure also relates to a method for grouping at least two target objects 6, 7, 8 detected outside a vehicle 1 using a radar sensor arrangement 3 that is used for detecting radar detections 9, 10, 11. The method includes:

Step: 43: detecting at least two radar detections 9, 10, 11 during at least two radar cycles.

Step: 44: for each radar cycle, generating a detection list $\{D_i^t\}^{t=t_0, \ldots, t_0-N}$ including range $r_i$), azimuth angle $\varphi_i$ and Doppler velocity $v_i$ for each one of said the radar detections 9, 10, 11.

Step: 45: aggregating and storing detection lists $\{D_i^t\}^{t=t_0, \ldots, t_0-N}$ from the radar cycles.

Step: 46: grouping the radar detections 9, 10, 11 in the detection lists $\{D_i^t\}^{t=t_0, \ldots, t_0-N}$ into consistently moving motion subsets 40, 41, 42 in a segmentation procedure, each motion subset 40, 41, 42 corresponding to a certain target object 6, 7, 8.

The present disclosure is not limited to the examples above, but may vary freely within the scope of the appended claims. For example, the radar sensor arrangement 3 is assumed to be of a previously known design, for example including a radar transmitter, a radar receiver and a receiving antenna array. The radar sensor arrangement 3 may furthermore include a number of other parts, and is for example connected to a warning and/or information device included in the vehicle 1 in a previously known manner.

The calculations and determining procedures are performed by the processing unit 4, where the processing unit 4 should be regarded as a processing unit arrangement that is in the form of one unit or several units that either co-operate or handle different tasks more or less independently. In the case of several units, these may be placed adjacent to each other, or in a distributed manner.

According to some aspects. the vehicle environment detection system includes other detection devices such as a camera device 30. LIDAR devices and other similar arrangements are also conceivable. According to some aspects, the vehicle environment detection system includes several detection devices of a certain type, such as for example several radar sensor arrangements that are adapted to cover different fields of view.

All details given in the examples are of course only given as an illustration of the present disclosure, and should not be regarded as limiting in any way.

Generally, the present disclosure relates to a vehicle environment detection system 2 that includes at least one radar sensor arrangement 3 and at least one processing unit 4, where the radar sensor arrangement 3 is arranged to detect at least two radar detections 9, 10, 11 during at least two radar cycles, where, for each radar cycle, the processing unit 4 is arranged to generate a detection list $\{D_i^t\}^{t=t_0, \ldots, t_0-N}$ including range $r_i$, azimuth angle $\varphi_i$ and Doppler velocity $v_i$ for each one of the radar detections 9, 10, 11. The processing unit 4 is further arranged to aggregate and store detection lists $\{D_i^t\}^{t=t_0, \ldots, t_0-N}$ from the radar cycles in a detection memory 12, and then to group the radar detections 9, 10, 11 in the detection lists $\{D_i^t\}^{t=t_0, \ldots, t_0-N}$ into consistently moving motion subsets 40, 41, 42 in a segmentation procedure, each motion subset 40, 41, 42 corresponding to a certain target object 6, 7, 8.

According to an example, for each radar cycle, the processing unit 4 is arranged to:

generate an output list M of motion subsets 40, 41, 42, where the output list M includes a group motion vector $V_k$ for each motion subset 40, 41, 42, and where each group motion vector $V_k$ represents a group motion of a respective motion subset 40, 41, 42; and to generate a labelling $L_i$ of each input detection, where, for each radar detection, the labelling $L_i$ includes an object identifier $I_i$ which describes to which motion subset a given radar detection belongs, and additional flags $f_i$ for each radar detection.

According to an example, in order to perform the segmentation procedure, for each one of all available motion subsets the processing unit 4 is arranged to:

predict a present motion subset 40 for the next radar cycle, independently of other motion subsets 41, 42;

associate new radar detections with the present motion subset 40; and to generate an updated group motion vector, where the processing unit 4 further is arranged to generate an updated list $M_u$ of motion subsets.

According to an example, the processing unit 4 is arranged to determine that radar detections which are not associated with any existing motion subset are unassociated, where the processing unit 4 is arranged to seek for new motion subsets for the unassociated radar detections.

According to an example, the processing unit 4 is arranged to:

detect if at least two motion subsets 31, 32 have equal group motion vectors $V_{A1}$, $V_{A2}$, and to detect if the radar detections 34, 35, 36 follow a respective common cosine curve in an azimuth angle vs. Doppler velocity domain, where the corresponding cosine curves overlap, and if that is determined to be the case, the processing unit 4 is arranged to merge the motion subsets 31, 32 into one merged subset 37.

Generally, the present disclosure also relates to a method for grouping at least two target objects 6, 7, 8 detected outside a vehicle 1 using a radar sensor arrangement 3 that is used for detecting radar detections 9, 10, 11, where the method includes:

Step: 43: detecting at least two radar detections 9, 10, 11 during at least two radar cycles; and Step: 44: for each radar cycle, generating a detection list $\{D_i^t\}^{t=t_0, \ldots, t_0-N}$ including range $r_i$, azimuth angle $\varphi_i$ and Doppler velocity $v_i$ for each one of the radar detections 9, 10, 11, characterized in that the method further includes:

Step: 45: aggregating and storing detection lists $\{D_i^t\}^{t=t_0, \ldots, t_0-N}$ from the radar cycles in a detection memory 12; and Step: 46: grouping the radar detections 9, 10, 11 in the detection lists $\{D_i^t\}^{t=t_0, \ldots, t_0-N}$ into consistently moving motion subsets 40, 41, 42 in a segmentation procedure, each motion subset 40, 41, 42 corresponding to a certain target object 6, 7, 8.

According to an example embodiment, for each radar cycle, the method includes:

generating an output list M of motion subsets 40, 41, 42, where the output list M includes a group motion vector $V_k$ for each motion subset 40, 41, 42, and where each group motion vector $V_k$ represents a group motion of a respective motion subset 40, 41, 42; and generating a labelling $L_i$ of each input detection, where, for each radar detection, the labelling $L_i$ includes an object identifier $I_i$ which describes to which motion subset a given radar detection belongs, and additional flags $f_i$ for each radar detection.

According to an example embodiment, in order to perform the segmentation procedure, for each one of all available motion subsets the method includes:

Step: 24: predicting a present motion subset 40 for the next radar cycle, independently of other motion subsets 41, 42;

Step: 25: associating new radar detections with the present motion subset 40; and Step: 26: generating an updated group motion vector;

where the method further includes generating an updated list $M_u$ of motion subsets.

According to an example, the method includes:

determining that radar detections which are not associated with any existing motion subset are unassociated; and seeking for new motion subsets for the unassociated radar detections.

According to an example embodiments, the method includes the steps of:

detecting if at least two motion subsets 31, 32 have equal group motion vectors $V_{A1}$, $V_{A2}$, and detecting if the radar detections 34, 35, 36 follow a respective common cosine curve in an azimuth angle vs. Doppler velocity domain, where the corresponding cosine curves overlap, and if that is determined to be the case, the method includes merging the motion subsets 31, 32 into one merged subset 37.

While the above description constitutes the preferred embodiment of the present invention, it will be appreciated that the invention is susceptible to modification, variation and change without departing from the proper scope and fair meaning of the accompanying claims.

The invention claimed is:

1. A vehicle environment detection system comprising, at least one radar sensor arrangement and at least one processing unit, where the radar sensor arrangement is arranged to detect at least two radar detections during at least two radar cycles, where, for each radar cycles, the processing unit is arranged to generate a detection list including a range, an azimuth angle and a Doppler velocity for each of the radar detections, the processing unit is further arranged to aggregate and store detection lists-from the radar cycles in a detection memory, and to group the radar detections in the detection lists into a plurality of moving motion subsets in a segmentation procedure, each of the motion subsets corresponding to a certain target object; and for each of the radar cycles, the processing unit is arranged to:

generate an output list of the motion subsets, where the output list comprises a group motion vector for each of the motion subsets, and where each of the group motion vectors represents a group motion of a respective motion subset; and to generate a labelling of each of the radar detections, where, for each of the radar detections, the labelling comprises an object identifier which describes to which of the motion subsets a given radar detection belongs, and additional flags for each of the radar detections, and such that each motion subset is represented only by a corresponding group motion vector and the labeling of the radar detections associated therewith.

2. A vehicle environment detection system according to claim 1 further comprising that in order to perform the segmentation procedure, for each of the motion subsets the processing unit is arranged to:

predict a present motion subset for a next radar cycle, independently of other of the motion subsets;

associate new radar detections with the present motion subset; and to generate an updated group motion vector;

where the processing unit further is arranged to generate an updated list of the motion subsets.

3. A vehicle environment detection system according to claim 2 further comprising, the processing unit is arranged to determine that the radar detections which are not associated with an existing motion subset are unassociated, where the processing unit is arranged to seek for new motion subsets for the unassociated radar detections.

4. A vehicle environment detection system according to claim 1 further comprising, the processing unit is arranged to:

detect if at least two of the motion subsets have equal group motion vectors; and to detect if the radar detections follow a respective common cosine curve in an azimuth angle vs. Doppler velocity domain, where the corresponding cosine curves overlap, and if that is determined to be the case, the processing unit is arranged to merge the motion subsets into one merged subset.

5. A method for grouping at least two target objects detected outside a vehicle using a radar sensor arrangement that is used for detecting radar detections, where the method comprises:

detecting at least two radar detections during at least two radar cycles; and for each of the radar cycles, generating a detection list range, an azimuth angle and a Doppler velocity for each one of the radar detections;

aggregating and storing detection lists from the radar cycles in a detection memory; and grouping the radar detections in the detection lists into consistently moving motion subsets in a segmentation procedure, each of the motion subsets corresponding to a certain target object;

generating an output list of the motion subsets, where the output list comprises a group motion vector for each of the motion subsets, and where the group motion vector represents a group motion of a respective motion subset; and generating a labelling of each of the radar detections, where, for each radar detection, the labelling comprises an object identifier which describes to which motion subset a given radar detection belongs, and additional flags for each of the radar detections, and such that each motion subset is represented only by a corresponding group motion vector and the labeling of the radar detections associated therewith.

6. The method according to claim 5 in order to perform the segmentation procedure, for each one of all available motion subsets the method comprises:

predicting a present motion subset for a next radar cycle, independently of the other motion subsets;

associating new radar detections with the present motion subset; and generating an updated group motion vector;

where the method further comprises generating an updated list of the motion subsets.

7. The method according to claim 6 wherein the method comprises:

determining that radar detections which are not associated with any existing motion subset are unassociated; and seeking for new motion subsets for the unassociated radar detections.

8. The method according to claim 5 further comprising:

detecting if at least two of the motion subsets have equal group motion vectors; and detecting if the radar detections follow a respective common cosine curve in an azimuth angle vs. Doppler velocity domain, where the corresponding cosine curves overlap, and if that is determined to be the case, the method comprises merging the motion subsets into one merged subset.

* * * * *